US012552585B2

(12) United States Patent
Philip

(10) Patent No.: US 12,552,585 B2
(45) Date of Patent: Feb. 17, 2026

(54) CLOSURE ASSEMBLY FOR FILLING A CONTAINER UNDER ISOLATED CONDITIONS

(71) Applicant: AMCOR RIGID PACKAGING USA, LLC, Ann Arbor, MI (US)

(72) Inventor: Bradley S. Philip, Tecumseh, MI (US)

(73) Assignee: AMCOR RIGID PACKAGING USA, LLC, Manchester, MI (US)

( * ) Notice: Subject to any disclaimer, the term of this patent is extended or adjusted under 35 U.S.C. 154(b) by 27 days.

(21) Appl. No.: 18/286,414

(22) PCT Filed: Apr. 16, 2021

(86) PCT No.: PCT/US2021/027592
§ 371 (c)(1),
(2) Date: Oct. 11, 2023

(87) PCT Pub. No.: WO2022/220838
PCT Pub. Date: Oct. 20, 2022

(65) Prior Publication Data
US 2024/0182215 A1 Jun. 6, 2024

(51) Int. Cl.
*B65D 51/14* (2006.01)
*A61J 1/14* (2023.01)
(Continued)

(52) U.S. Cl.
CPC .......... *B65D 51/145* (2013.01); *A61J 1/1418* (2015.05); *B65D 51/20* (2013.01); *B65D 51/24* (2013.01);
(Continued)

(58) Field of Classification Search
CPC .......... A61J 1/1418; B65B 1/06; B65B 3/006; B65D 1/0223; B65D 1/023; B65D 1/0246;
(Continued)

(56) References Cited

U.S. PATENT DOCUMENTS 2,077,985 A * 4/1937 Bukolt ................ B65D 51/145 222/545
2,364,126 A * 12/1944 Cantor ............... B65D 81/3205 215/6
(Continued)

FOREIGN PATENT DOCUMENTS

AU 749742 B2 7/2002
GB 2190903 A * 12/1987 ........... B65D 55/066
(Continued)

OTHER PUBLICATIONS

International Search Report and Written Opinion of the ISA issued in PCT/US2021/027592, mailed Jan. 4, 2022; ISA/KR.
(Continued)

*Primary Examiner* — Anthony D Stashick
*Assistant Examiner* — Marcos Javier Rodriguez Molina
(74) *Attorney, Agent, or Firm* — Harness, Dickey & Pierce, P.L.C.

(57) ABSTRACT

A closure assembly for filling a container under isolated conditions. The closure assembly includes a collar with internal threads for coupling with a finish of the container. A disc includes first coupling members for removably coupling with the collar. A liner is secured to the disc. The liner is seated on the finish of the container when the collar is coupled to the finish.

17 Claims, 9 Drawing Sheets

(51) Int. Cl.

| | |
|---|---|
| ***B65D 51/20*** | (2006.01) |
| ***B65D 51/24*** | (2006.01) |
| ***B65D 53/04*** | (2006.01) |
| *B65B 1/06* | (2006.01) |
| *B65B 3/00* | (2006.01) |
| *B65D 41/04* | (2006.01) |

(52) U.S. Cl.

CPC ...... *B65D 53/04* (2013.01); *B65D 2251/0015* (2013.01); *B65D 2251/0093* (2013.01); *B65D 2251/06* (2013.01); *B65D 2251/205* (2013.01)

(58) Field of Classification Search

CPC . B65D 1/08; B65D 1/26; B65D 1/265; B65D 1/34; B65D 11/08; B65D 15/04; B65D 15/06; B65D 15/08; B65D 17/06; B65D 17/464; B65D 17/502; B65D 17/506; B65D 21/0233; B65D 2205/00; B65D 2205/02; B65D 2213/00; B65D 2215/02; B65D 2215/04; B65D 2215/08; B65D 2251/0015; B65D 2251/0025; B65D 2251/0093; B65D 2251/06; B65D 2251/1008; B65D 2251/105; B65D 2251/1066; B65D 2251/1075; B65D 2251/20; B65D 2251/205; B65D 23/00; B65D 23/06; B65D 2401/10; B65D 2401/15; B65D 2401/20; B65D 2401/25; B65D 2401/30; B65D 2401/35; B65D 2401/40; B65D 2401/60; B65D 25/16; B65D 25/38; B65D 2517/0013; B65D 2517/0061; B65D 2517/0065; B65D 2517/0086; B65D 2517/5032; B65D 2517/5054; B65D 2517/5083; B65D 2517/5091; B65D 2543/00027; B65D 2543/00083; B65D 2543/00092; B65D 2543/00194; B65D 2543/00268; B65D 2543/00277; B65D 2543/00296; B65D 2543/0037; B65D 2543/00379; B65D 2543/00407; B65D 2543/0049; B65D 2543/00509; B65D 2543/00518; B65D 2543/00537; B65D 2543/00546; B65D 2543/00555; B65D 2543/00574; B65D 2543/00601; B65D 2543/0062; B65D 2543/00629; B65D 2543/00648; B65D 2543/00657; B65D 2543/00685; B65D 2543/00694; B65D 2543/00731; B65D 2543/0074; B65D 2543/0075; B65D 2543/00759; B65D 2543/00768; B65D 2543/00796; B65D 2543/00805; B65D 2543/00824; B65D 2543/00842; B65D 2543/00898; B65D 2543/00972; B65D 2571/00172; B65D 2571/00185; B65D 3/10; B65D 3/28; B65D 33/1675; B65D 35/08; B65D 35/12; B65D 35/44; B65D 37/00; B65D 41/02; B65D 41/04; B65D 41/045; B65D 41/0471; B65D 41/0478; B65D 41/0492; B65D 41/12; B65D 41/18; B65D 41/26; B65D 41/32; B65D 41/325; B65D 41/34; B65D 41/3404; B65D 41/3409; B65D 41/3414; B65D 41/3428; B65D 41/3438; B65D 41/3447; B65D 41/348; B65D 41/42; B65D 41/485; B65D 41/62; B65D 43/02; B65D 43/0208; B65D 43/021; B65D 43/0212; B65D 43/0218; B65D 43/0231; B65D 43/0249; B65D 43/0254; B65D 43/0256; B65D 43/161; B65D 43/163; B65D 43/169; B65D 45/20; B65D 45/322; B65D 47/06; B65D 47/063; B65D 47/0804; B65D 47/0833; B65D 47/0838; B65D 47/0861; B65D 47/10; B65D 47/103; B65D 47/12; B65D 47/123; B65D 47/141; B65D 47/148; B65D 47/2031; B65D 47/242; B65D 47/263; B65D 47/265; B65D 47/36; B65D 47/40; B65D 49/06; B65D 5/067; B65D 5/22; B65D 5/56; B65D 5/6664; B65D 5/708; B65D 5/723; B65D 50/043; B65D 50/045; B65D 50/046; B65D 50/06; B65D 50/061; B65D 51/002; B65D 51/145; B65D 51/1616; B65D 51/185; B65D 51/20; B65D 51/221; B65D 51/225; B65D 51/24; B65D 51/241; B65D 51/243; B65D 51/28; B65D 51/2807; B65D 51/2835; B65D 51/2864; B65D 53/02; B65D 53/04; B65D 55/02; B65D 55/024; B65D 55/06; B65D 55/0836; B65D 55/16; B65D 65/466; B65D 7/00; B65D 7/04; B65D 7/42; B65D 71/12; B65D 75/28; B65D 75/5883; B65D 77/0486; B65D 81/266; B65D 81/3211; B65D 81/325; B65D 83/141; B65D 83/76

USPC ......... 206/0.5, 0.7, 0.81, 1.5, 139, 140, 141, 206/147, 15.2, 15.3, 151, 152, 153, 155, 206/157, 158, 162, 194, 204, 205, 216, 206/217, 219, 221, 222, 223, 229, 232, 206/233, 235, 250, 251, 261, 265, 268, 206/273, 277, 301, 306, 308.1, 308.2, 206/310, 315.1, 315.11, 317, 320, 337, 206/342, 349, 352, 355, 362.4, 364, 365, 206/366, 37, 370, 372, 373, 384, 385, 206/387.1, 387.11, 387.13, 390, 401, 403, 206/405, 406, 408, 409, 422, 423, 427, 206/428, 434, 438, 445, 45.2, 456, 457, 206/459.1, 459.5, 462, 463, 466, 470, 206/471, 472, 474, 482, 484, 485, 485.1, 206/486, 489, 493, 497, 499, 5.1, 501, 206/503, 505, 506, 508, 509, 511, 512, 206/514, 515, 518, 519, 520, 521, 521.1, 206/521.15, 521.8, 523, 524.2, 524.3, 206/524.5, 525, 526, 527, 528, 531, 532, 206/533, 534, 535, 536, 538, 539, 540, 206/541, 544, 545, 549, 550, 553, 557, 206/562, 570, 579, 581, 589, 591, 599, 206/63.5, 710, 740, 765, 771, 776, 779, 206/782, 783, 804, 805, 806, 807, 811, 206/815, 818, 819, 820, 821, 823, 831; 222/545; 215/10, 11.1, 11.3, 11.4, 11.5, 215/11.6, 12.1, 12.2, 13.1, 14, 17, 19, 20, 215/200, 201, 203, 204, 206, 207, 208, 215/209, 21, 210, 211, 212, 213, 214, 215/215, 216, 217, 218, 219, 22, 220, 215/221, 222, 223, 224, 225, 226, 227, 215/228, 229, 23, 230, 231, 232, 233, 215/235, 236, 237, 238, 239, 240, 242, 215/243, 244, 245, 246, 247, 249, 25, 215/250, 251, 252, 253, 254, 255, 256, 215/257, 258, 26, 260, 261, 262, 270, 215/271, 272, 273, 274, 275, 276, 277, 215/278, 279, 28, 280, 281, 283, 284,

215/285, 286, 287, 29, 290, 291, 292, 215/293, 294, 295, 296, 297, 298, 299, 3, 215/30, 301, 302, 303, 304, 305, 306, 215/307, 308, 309, 310, 311, 312, 313, 215/315, 316, 317, 318, 319, 320, 321, 215/322, 323, 324, 325, 326, 327, 328, 215/329, 330, 331, 332, 333, 334, 335, 215/336, 337, 338, 339, 340, 341, 342, 215/343, 344, 345, 346, 347, 348, 349, 215/350, 351, 352, 353, 354, 355, 356, 215/357, 358, 359, 360, 361, 362, 363, 215/364, 365, 370, 375, 377, 382, 383, 215/384, 386, 387, 388, 389, 391, 392, 215/393, 396, 40, 42, 43, 44, 45, 46, 47, 215/48, 5, 50, 52, 53, 55, 6, 900, 901, 215/902, DIG. 1, DIG. 3, DIG. 7, DIG. 8; 220/1.5, 2.3 R, 200, 201, 203.01, 203.02, 220/203.03, 203.04, 203.08, 203.09, 220/203.23, 203.24, 203.26, 210, 212, 220/212.5, 213, 214, 216, 221, 229, 23.4, 220/23.8, 23.83, 23.86, 23.87, 23.9, 230, 220/231, 234, 236, 237, 248, 251, 253, 220/254.1, 254.2, 254.3, 254.4, 254.5, 220/254.6, 254.7, 254.8, 254.9, 255, 220/255.1, 256.1, 257.1, 257.2, 258.1, 220/258.2, 258.3, 258.5, 259.1, 259.2, 220/259.3, 259.4, 260, 262, 263, 264, 220/265, 266, 267, 268, 269, 270, 271, 220/274, 276, 277, 280, 281, 283, 284, 220/285, 287, 288, 290, 291, 293, 294, 220/295, 296, 297, 298, 299, 3.8, 300, 220/301, 302, 303, 304, 309.1, 309.2, 220/310.1, 314, 315, 316, 318, 319, 320, 220/321, 322, 323, 324, 325, 326, 327, 220/345.1, 345.2, 345.3, 345.4, 359.4, 220/360, 361, 366.1, 367.1, 371, 373, 220/374, 375, 377, 378, 379, 380, 4.01, 220/4.02, 4.08, 4.21, 4.22, 4.23, 4.24, 220/4.26, 4.27, 4.28, 475, 476, 480, 481, 220/482, 484, 495.01, 495.03, 495.04, 220/495.05, 495.06, 495.07, 495.09, 500, 220/502, 505, 507, 512, 516, 521, 522, 220/524, 528, 532, 555, 559, 560.03, 570, 220/571, 573.4, 576, 592.01, 592.1, 220/592.19, 592.2, 592.24, 592.27, 6, 220/600, 601, 602, 604, 608, 610, 611, 220/614, 615, 617, 619, 62, 62.11, 62.12, 220/62.15, 62.16, 62.18, 62.21, 62.22, 220/620, 621, 625, 628, 630, 632, 633, 220/636, 640, 641, 642, 644, 648, 657, 220/658, 659, 661, 662, 669, 675, 676, 220/680, 681, 686, 694, 697, 698, 7, 700, 220/701, 703, 708, 709, 710, 710.5, 713, 220/714, 717, 724, 727, 735, 736, 739, 220/745, 754, 756, 757, 758, 759, 760, 220/761, 762, 763, 764, 770, 771, 772, 220/773, 776, 780, 781, 782, 783, 784, 220/785, 786, 787, 788, 789, 790, 791, 220/792, 793, 794, 795, 796, 799, 8, 801, 220/802, 803, 805, 806, 810, 811, 814, 220/817, 821, 822, 826, 829, 830, 832, 220/833, 834, 835, 836, 837, 838, 839, 220/840, 841, 843, 844, 845, 847, 849, 220/86.1, 86.2, 902, 903, 906, 908, 908.1, 220/912, 915, 917, DIG. 1, DIG. 15, 220/DIG. 28, DIG. 32, DIG. 33, DIG. 34, 220/DIG. 6, FOR. 100

See application file for complete search history.

(56) References Cited

U.S. PATENT DOCUMENTS

| | | | | |
|---|---|---|---|---|
| 4,122,964 | A * | 10/1978 | Morris | B65D 51/145 215/276 |
| 4,747,500 | A * | 5/1988 | Gach | B65D 55/02 215/349 |
| 7,134,565 | B1 * | 11/2006 | Wan | B65D 41/0492 215/276 |
| 7,147,118 | B2 * | 12/2006 | Bloom | B65B 55/24 215/276 |
| 9,221,579 | B2 | 12/2015 | Thorstensen-Woll | |
| 9,688,451 | B2 * | 6/2017 | Kapolas | B65D 51/145 |
| 10,486,867 | B2 * | 11/2019 | Graybill | B65D 1/0207 |
| 2005/0199313 | A1 * | 9/2005 | Edwards | B65D 41/3409 141/114 |
| 2010/0084403 | A1 * | 4/2010 | Popish | G21F 5/002 220/318 |
| 2014/0072669 | A1 * | 3/2014 | Brown, III | B65D 51/145 222/545 |
| 2014/0263323 | A1 * | 9/2014 | Thorstensen-Woll | B65D 51/005 220/270 |
| 2015/0368000 | A1 * | 12/2015 | Price | B65D 51/20 215/350 |
| 2016/0159546 | A1 | 6/2016 | Cassidy et al. | |
| 2017/0092383 | A1 * | 3/2017 | Wickland | G21F 5/005 |
| 2018/0133399 | A1 * | 5/2018 | Kumar | A61K 9/0095 |
| 2018/0148232 | A1 * | 5/2018 | Castillo | B65D 41/58 |
| 2019/0276191 | A1 * | 9/2019 | Brozell | B65D 53/02 |

FOREIGN PATENT DOCUMENTS

| | | | | |
|---|---|---|---|---|
| JP | 2016188103 A | | 11/2016 | |
| KR | 1020160031525 A | | 3/2016 | |
| WO | WO9103404 A | * | 3/1991 | B65D 51/145 |
| WO | WO-0000390 A1 | | 1/2000 | |
| WO | WO-2008106195 A1 | | 9/2008 | |

OTHER PUBLICATIONS

Extended European Search Report from counterpart EP219371622, dated Dec. 12, 2024.

* cited by examiner

CLOSURE ASSEMBLY FOR FILLING A CONTAINER UNDER ISOLATED CONDITIONS

CROSS-REFERENCE TO RELATED APPLICATIONS

This application is a U.S. National Phase Patent Application under 35 U.S.C. 371 of International Application No. PCT/US2021/027592, filed on Apr. 16, 2021, the entire disclosure of which is incorporated herein by reference.

FIELD

The present disclosure relates to a closure assembly for filling a container, such as a pharmaceutical container, under isolated conditions.

BACKGROUND

This section provides background information related to the present disclosure, which is not necessarily prior art.

Various containers, such as pharmaceutical containers, must be filled under isolated conditions. While existing filling devices and filling methods are suitable for their intended use, they are subject to improvement. The present disclosure includes an assembly for filling a container under isolated conditions having the advantages set forth herein, as well as numerous additional advantages as one skilled in the art will appreciate.

SUMMARY

This section provides a general summary of the disclosure, and is not a comprehensive disclosure of its full scope or all of its features.

The present disclosure includes a closure assembly for filling a container under isolated conditions. The closure assembly has a collar with internal threads for coupling with a finish of the container. A disc includes first coupling members for removably coupling with the collar. A liner is secured to the disc. The liner is seated on the finish of the container when the collar is coupled to the finish.

The present disclosure further includes a closure assembly for filling a container under isolated conditions. The closure assembly has a collar with internal threads for coupling with a finish of the container, an internal flange, and upper flanges spaced apart about the collar. A disc includes tabs configured to cooperate with the upper flanges to removably couple the disc to the collar. A liner is secured to the disc. The liner is sealable to a top sealing surface of the container. When the disc is coupled to the collar and the collar is coupled to the finish, the internal flange is seated on the finish of the container and the liner is seated on the finish inboard of the internal flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
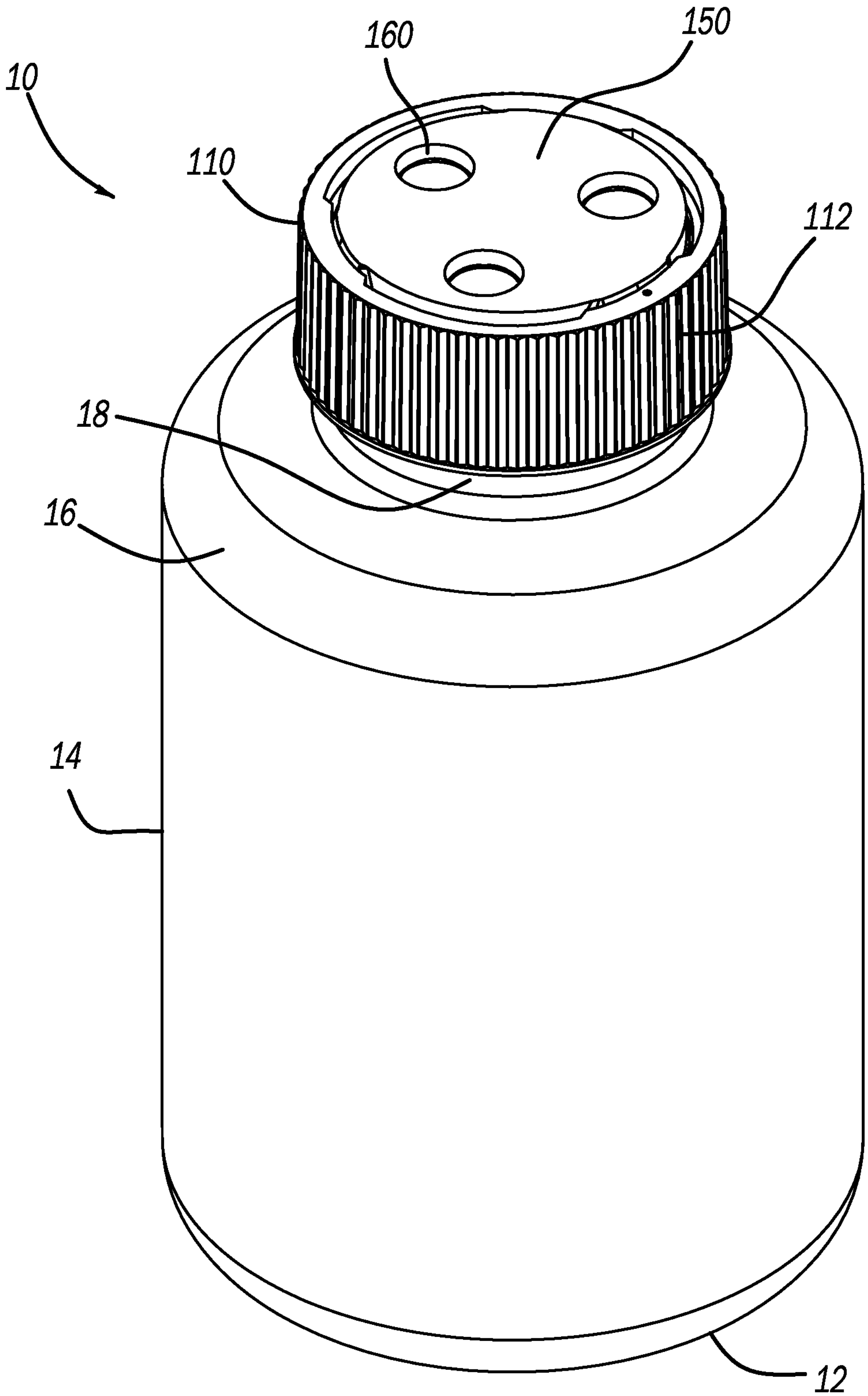
FIG. 1 is a perspective view of a container including a closure assembly in accordance with the present disclosure for filling the container under isolated conditions.
Figure 2:
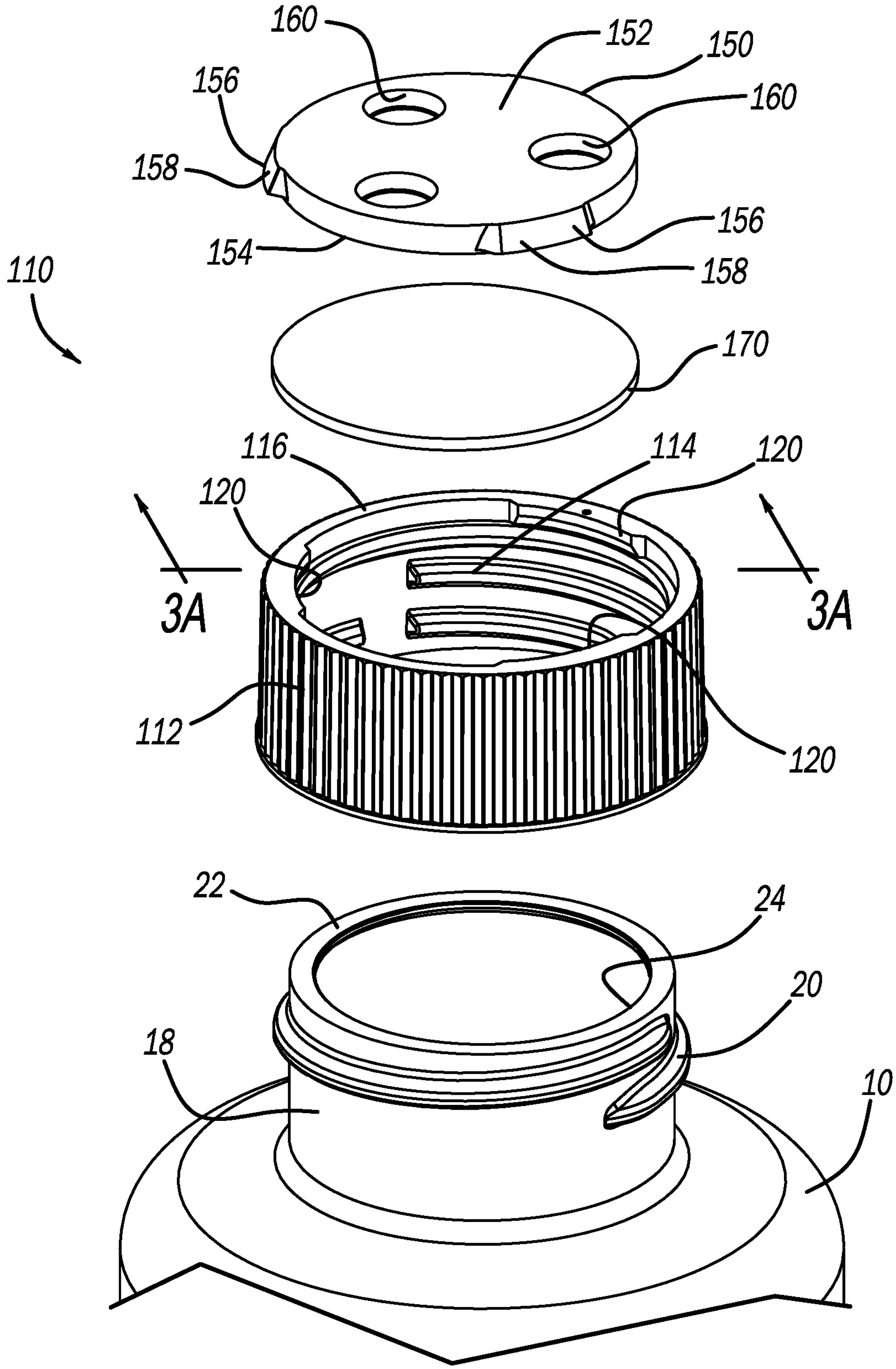
FIG. 2 is an exploded view of the closure assembly of FIG. 1.

FIGS. 1 and 2 illustrate an exemplary container 10 including a temporary closure assembly 110 for filling the container 10 under isolated conditions. The container 10 may have any suitable shape and size, and the closure assembly 110 is sized to fit the container 10. The container 10 may be configured to store any suitable product, particularly products that are filled under isolated conditions, such as pharmaceutical test trials. The closure assembly 110 advantageously allows the container 10 to be filled in an isolated manner. Thus, a plurality of the containers 10 each including the closure assembly 110 can be filled on multiple filling lines in close proximity without the risk of contamination from other substances that may produce dust, powder, liquids, etc. The elimination of cross-contamination also advantageously provides cost and time savings by reducing or eliminating downtime for cleaning filling lines and other filling equipment.

The container 10 generally includes a base 12. The base 12 may be any suitable base, such as a rigid or flexible base. Extending from the base 12 is a body 14. The body 14 defines an internal volume of the container 10 where the product is stored. Extending from the body 14 is a shoulder 16, which extends to a finish 18 of the container 10. As illustrated in FIG. 2, the finish 18 includes threads 20, which may be external threads as illustrated, or internal threads. At an uppermost portion of the finish 18 is a top sealing surface 22. The top sealing surface 22 includes a lip 24, which extends towards an axial center of the finish 18.

The temporary closure assembly 110 generally includes a collar 112, a disc 150, and a liner 170. The collar 112 includes internal threads 114, which are configured to cooperate with, and couple to, the external threads 20 of the finish 18. At or near an upper surface 116 of the collar 112 are a plurality of flanges 120. Any suitable number of the flanges 120 may be included, such as three flanges 120 as illustrated. The flanges 120 are evenly spaced apart about the collar 112. The flanges 120 may also be configured as threads.

Figure 3A:
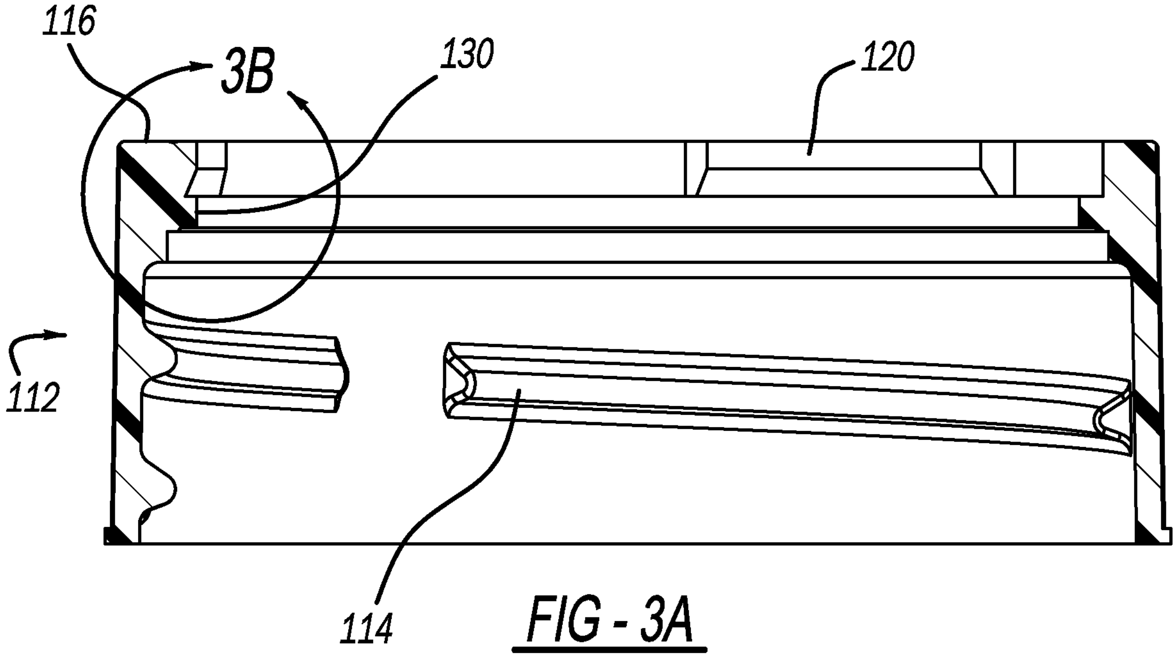
FIG. 3A is a cross-sectional view of a collar of the closure assembly.
Figure 3B:
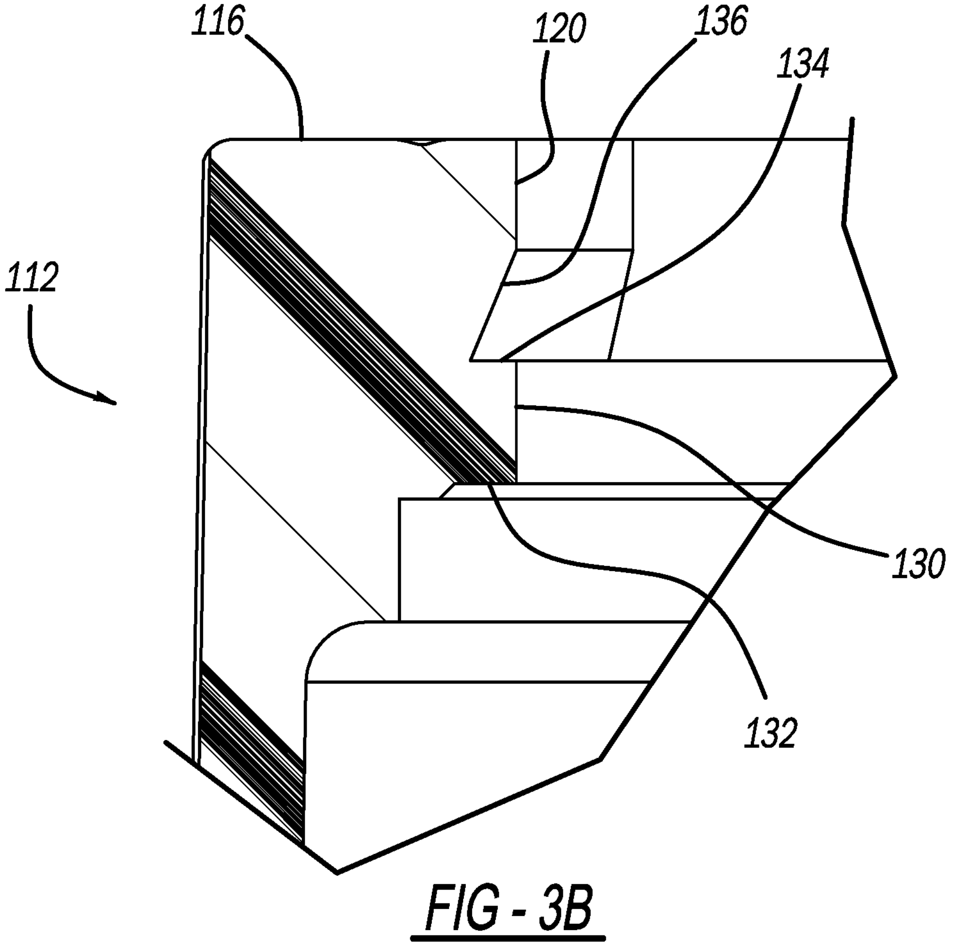
FIG. 3B illustrates area 3B of FIG. 3A.

With additional reference to FIGS. 3A and 3B, the collar 112 further includes an internal flange 130, which is recessed inward from the upper surface 116. The internal flange 130 has a lower ledge 132 at a lower face thereof, and an upper ledge 134 at an upper face thereof. The upper ledge 134 is opposite to the lower ledge 132. Adjacent to the upper ledge 134 are a plurality of ramped undersurfaces 136 of the flanges 120. Each one of the flanges 120 may include the ramped undersurface 136 as illustrated. The collar 112 may be formed in any suitable manner, such as by injection molding with any suitable polymer, such as high density polyethylene (HDPE) or polypropylene.

Figure 4:
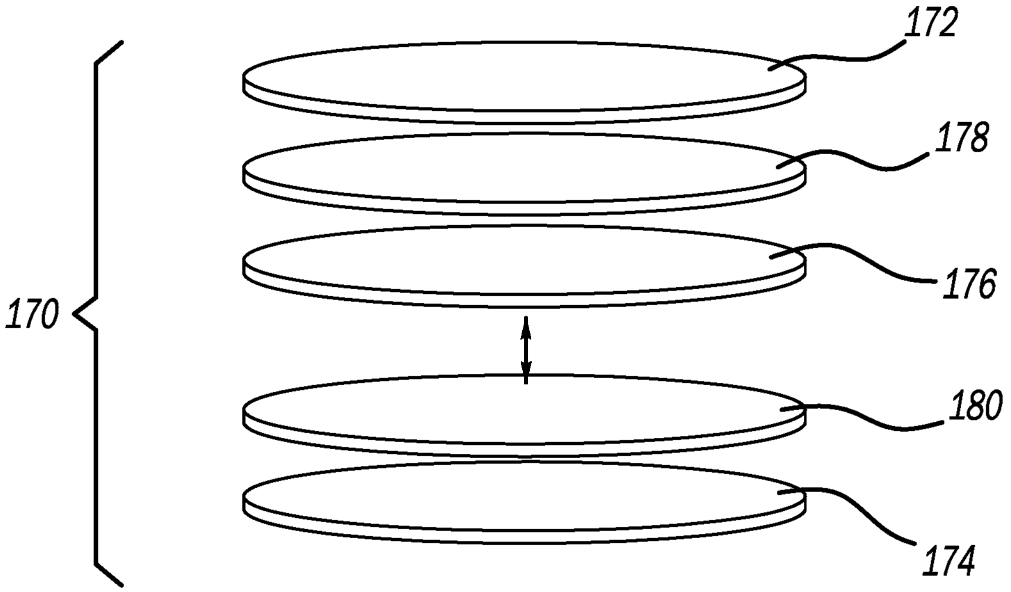
FIG. 4 is an exploded view of a liner of the closure assembly.

With reference to FIG. 4, the liner 170 will now be described further. The liner 170 may be any liner suitable for sealing the container 10, such as any liner suitable for sealing pharmaceutical bottles to provide a tamper evident bond. For example, the liner 170 may be a two-piece foam backed heat induction foil inner seal, such as FoilSeal™ from Selig Sealing Products, LLC of Forest, Illinois. In the example of FIG. 4, the liner 70 includes a backing 172, which is secured to the disc 150 in any suitable manner, such as by way of hot glue or a pressure sensitive adhesive. A heat seal layer 174 is at an outer surface of the liner 170. Between the backing 172 and the heat seal layer 174 is a wax layer 176. Between the wax layer 176 and the backing 172 is a paper layer 178. Between the heat seal layer 174 and the wax layer 176 is a foil layer 180. As described herein, the liner 170 advantageously creates a temporary hermetic seal during filling, and a permanent tamper evident seal after being induction sealed to the container 10. The liner 170 is round and has a diameter that is less than an inside diameter of the internal flange 130.

Figure 5:
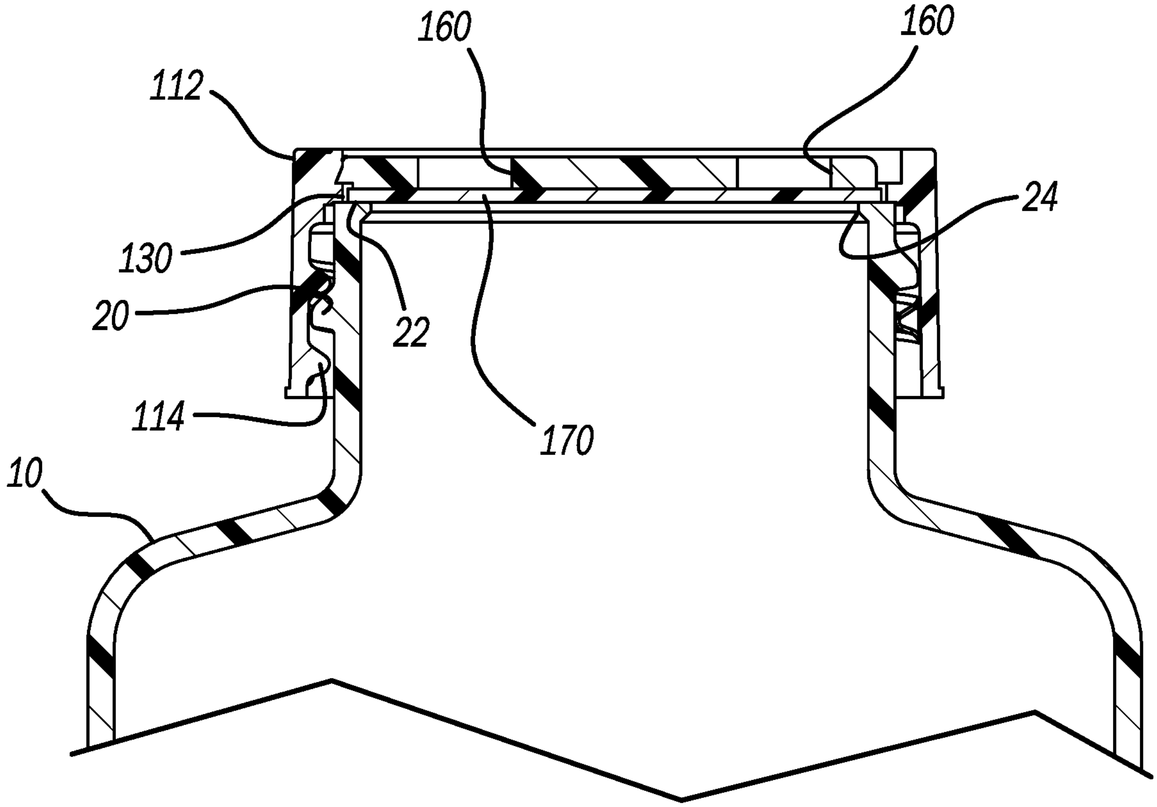
FIG. 5 is a cross-sectional view of the closure assembly coupled to a finish of the container.

With renewed reference to FIGS. 1 and 2, and additional reference to FIG. 5, the disc 150 is a round member made of any suitable material, such as any suitable polymer including HDPE or polypropylene. The disc 150 may be formed in any suitable manner, such as by injection molding. The disc 150 includes an outer surface 152 and an inner surface 154, which is opposite to the outer surface 152. Extending from an outer diameter of the disc 150 are a plurality of first coupling members for securing the disc 150 to the collar 112. In the example illustrated, the first coupling members include a plurality of tabs 156 spaced apart about the outer diameter of the disc 150. The tabs 156 may also be configured as threads. Any suitable number of tabs 156 may be included, such as three as illustrated. Each one of the tabs 156 includes an outer ramped surface 158. The outer ramped surfaces 158 are arranged at an angle that is the same as, or substantially similar to, the angle of the ramped undersurfaces 136 of the flanges 120 of the collar 112. Thus, the tabs 156 are configured to be seated beneath the flanges 120 against the upper ledge 134 with the outer ramped surfaces 158 against the ramped undersurfaces 136 to secure the disc 150 (with the liner 170 adhered thereto) to the collar 112. As illustrated in FIG. 5, with the disc 150 secured to the collar 112, and the collar 112 secured to the finish 18, the liner 170 is seated on an inner portion of the top sealing surface 22 and supported by the lip 24 of the finish 18. The internal flange 130 of the collar 112 is seated on an outer portion of the top sealing surface 22 and surrounds the liner 170. When the collar 112 is fully screwed onto the finish 18, the liner 170 will typically be compressed against the top sealing surface 22, such as by about 0.011".

Figure 6A:
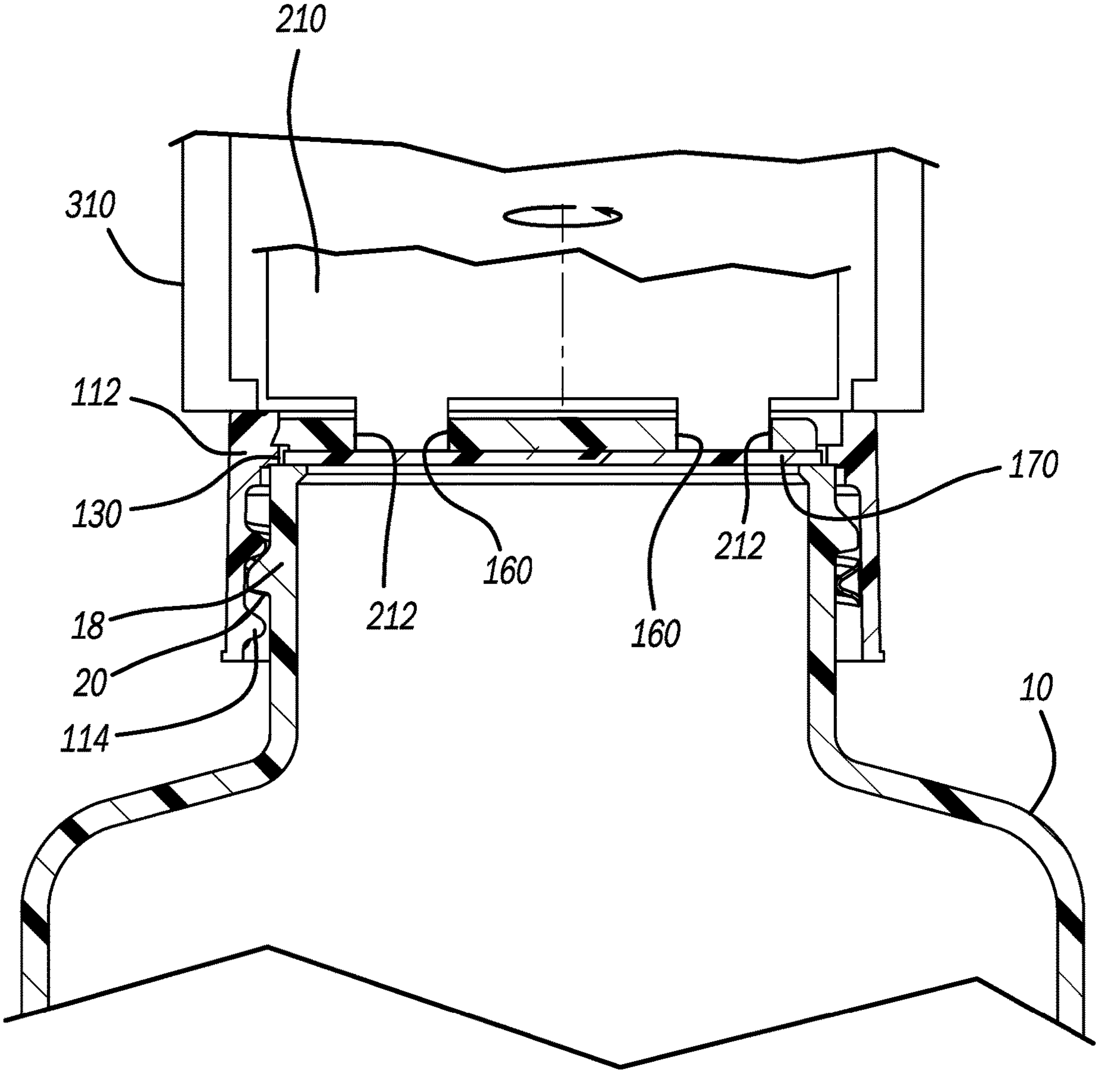
FIG. 6A illustrates an isolation cover over the closure assembly, and a tool in cooperation with a disc of the closure assembly.

At the outer surface 152 of the disc 150 are second coupling members. The second coupling members may be blind holes 160, or any other coupling member suitable to cooperate with a machine tool 210 (FIG. 6A) for removing the disc 150 from cooperation with the collar 112. In the example of FIG. 6A, the machine tool 210 includes fingers 212, which are sized and shaped to be inserted into the blind holes 160 for rotating the disc 150 and removing the disc 150 from cooperation with the collar 112. The machine tool 210 may also be configured to couple with the outer surface 152 of the disc 150 through suction, which may make the blind holes 160 (or any other second coupling members) unnecessary.

Figure 6B:
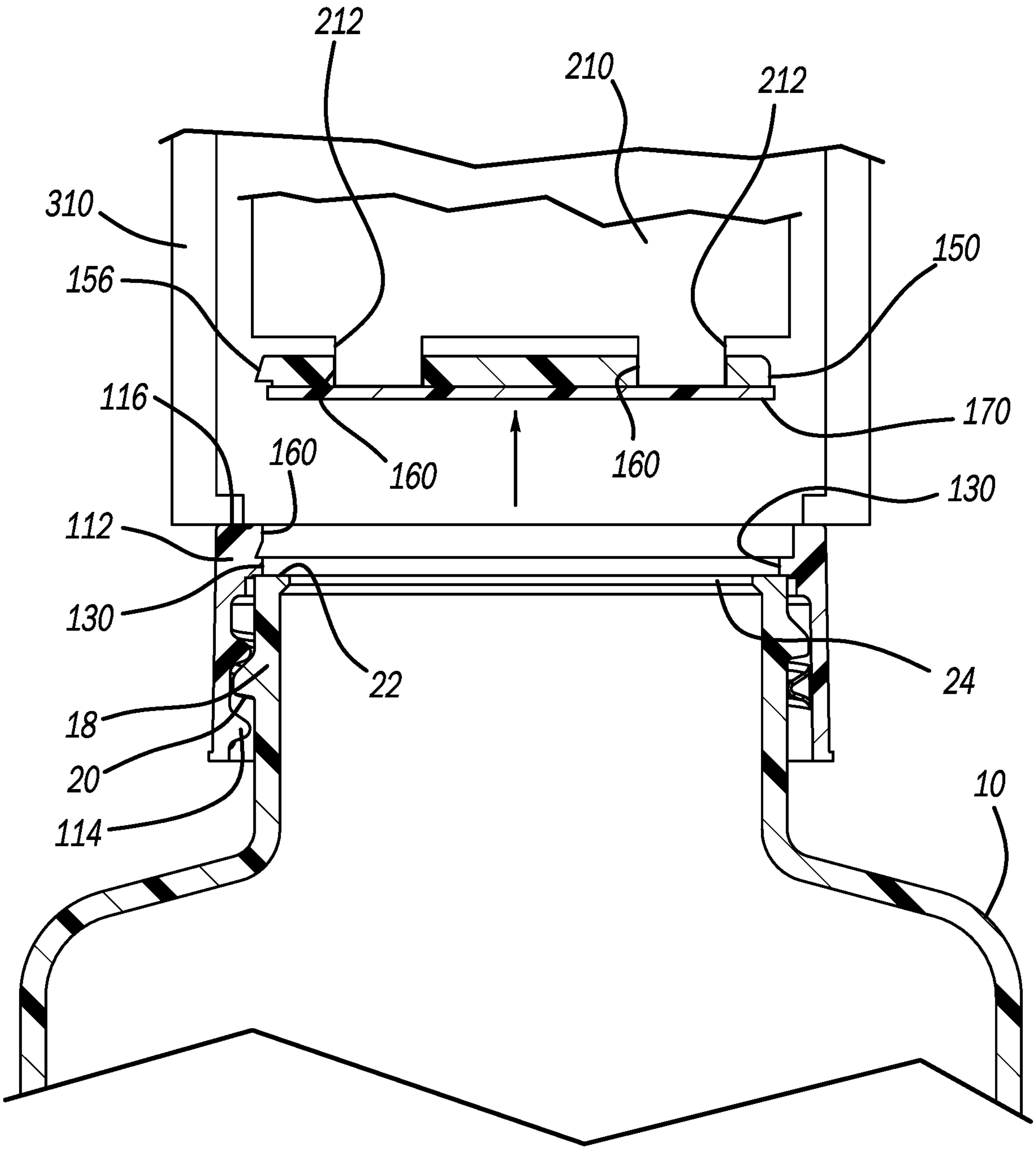
FIG. 6B illustrates the disc lifted from the collar by the tool.
Figure 6C:
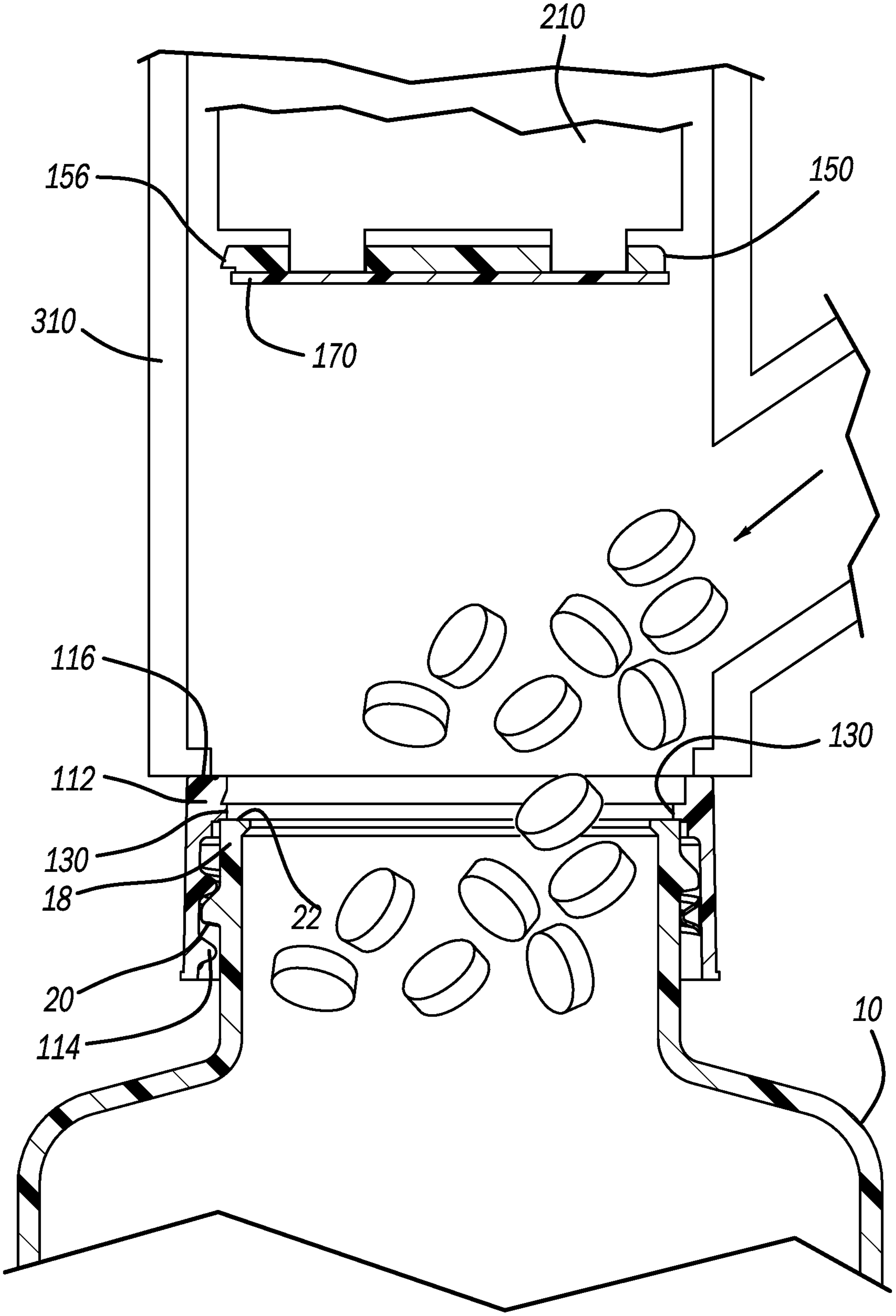
FIG. 6C illustrates the container being filled.

Use of the temporary isolated filling closure assembly 110 for filling the container 10 in an isolated manner will now be described with reference to FIGS. 6A-6E. FIG. 6A illustrates the machine tool 210 in cooperation with the disc 150 by way of the fingers 212 seated in the blind holes 160. To provide an isolated filling environment, an isolation cover 310 is seated over the closure assembly 110 and the finish 18. The machine tool 210 rotates the disc 150 so that the tabs 156 are no longer beneath the flanges 120 of the collar 112. The tool 210 then lifts the disc 150 out from within the collar 112, as illustrated in FIG. 6B. The liner 170 is adhered to the inner surface 154 of the disc 150, and thus the liner 170 is also lifted out from within the collar 112. This allows the container 10 to be filled in an isolated manner, as illustrated in FIG. 6C. The container 10 may be filled with any suitable pharmaceutical, or other product.

Figure 6D:
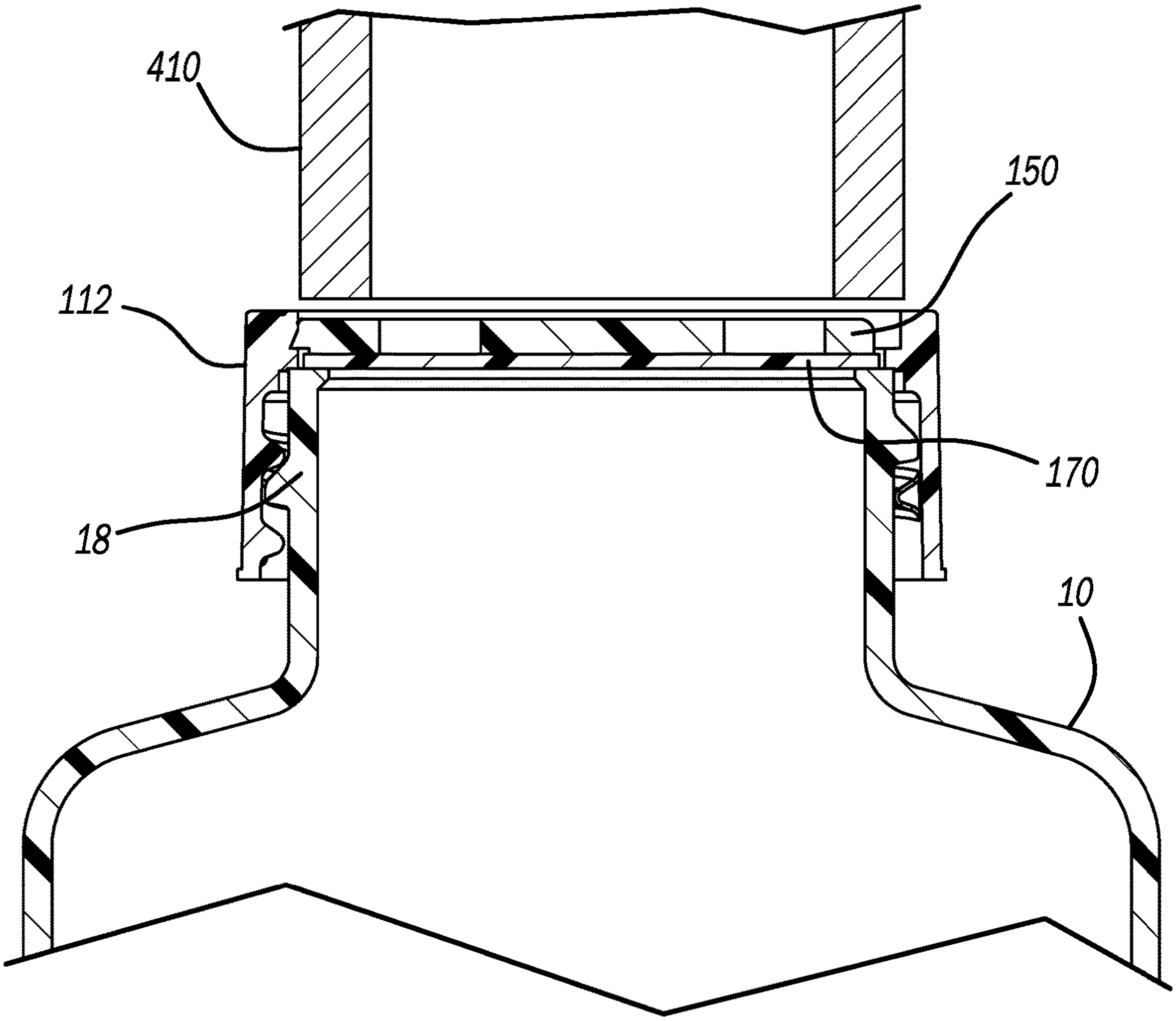
FIG. 6D illustrates the liner being sealed to the finish by an induction sealer.
Figure 6E:
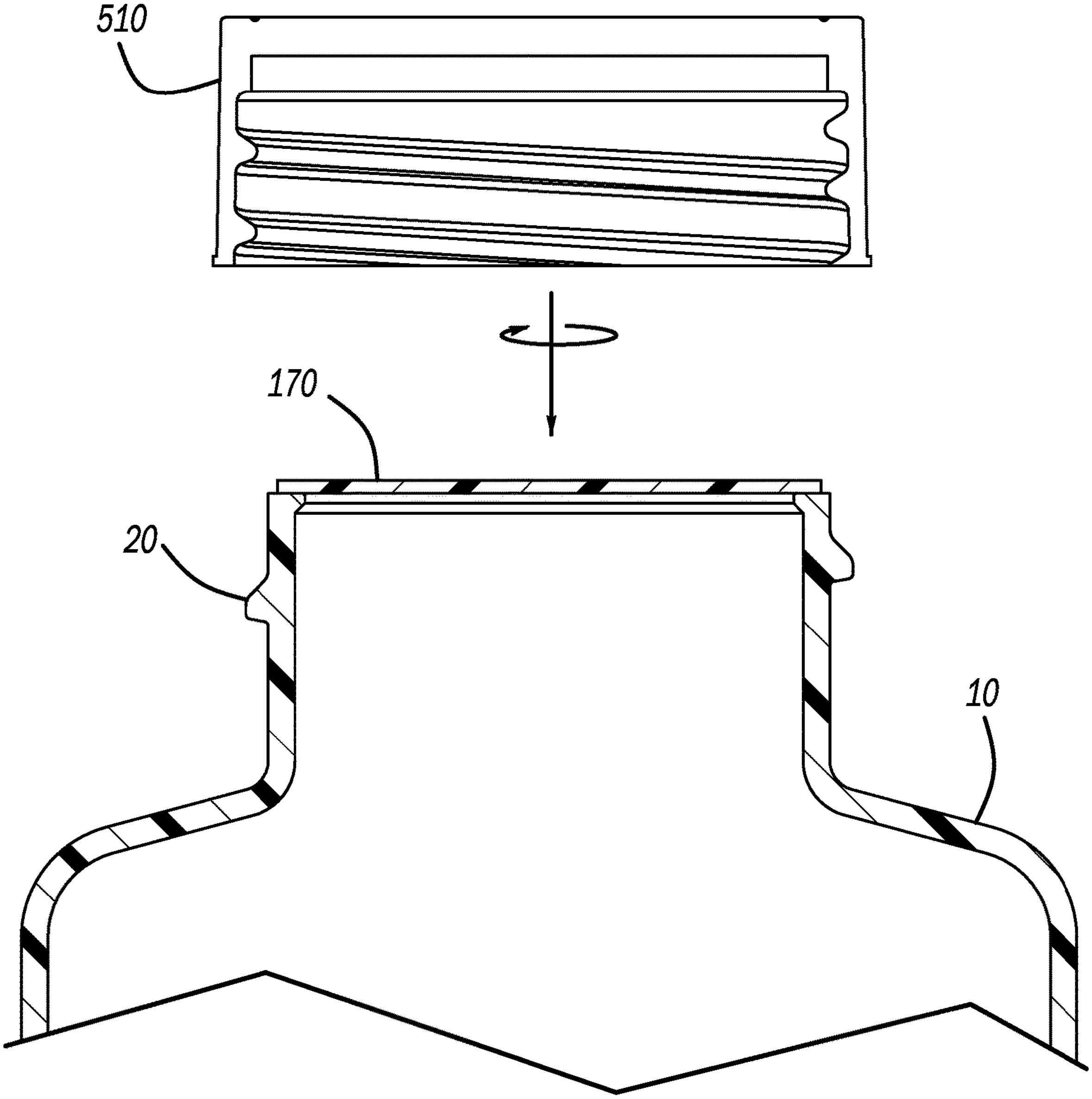
FIG. 6E illustrates the finish with the liner sealed thereto, the collar and the disc removed, and a final closure being coupled to the finish.

After the container 10 is filled, the tool 210 returns the disc 150 into cooperation with the collar 112 and rotates the disc 150 so that the tabs 156 are beneath the flanges 120, as illustrated in FIG. 6D. The liner 170 is seated on the inner portion of the top sealing surface 22 and the internal flange 130 is seated on the outer portion of the top sealing surface 22. The liner 170 is then sealed to the top sealing surface 22 in any suitable manner, such as with an induction sealer 410. The collar 112 with the disc 150 coupled thereto is then removed from cooperation with the finish 18. As the collar 112 is removed, the liner 170 separates at the wax layer 176, which leaves the foil layer 180 and heat seal layer 174 sealed to the top sealing surface 22, and the backing 172 remains attached to the disc 150. Any suitable closure 510 (see FIG. 6E), such as a childproof closure, is then secured to the finish 18 by way of cooperation between threads of the closure 510 and the threads 20 of the finish 18.

The disc 150 may be preassembled with the liner 170 adhered thereto prior to making the assembly 110 available to fillers. The container 10 may be provided to fillers with the closure assembly 110 coupled to the finish 18, or the closure assembly 110 may be provided to fillers independent of the container 10. The collar 112 may be reused for additional isolated filling, but not the disc 150 because the backing 172 and paper layer 178 of the liner 170 will remain secured to the disc 150.

The present disclosure thus advantageously provides for the temporary closure assembly 110 for filling the container 10 under isolated conditions, which may be particularly advantageous in pharmaceutical applications where many bottles are filled in close proximity to one another, thereby preventing any possible cross-contamination. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A closure assembly for filling a container under isolated conditions, the closure assembly comprising:

a collar including internal threads for coupling with a finish of the container and an internal flange extending around an inner surface of the collar, the internal flange has an upper ledge opposite to a lower ledge, the lower ledge is seated on an outer portion of a top sealing surface of the finish of the container when the collar is coupled to the finish;

a disc including first coupling members for removably coupling with the collar, the disc seated on the upper ledge of the internal flange when the disc is coupled to the collar; and a liner secured to the disc, the liner is seated on the finish of the container when the collar is coupled to the finish, wherein with the collar coupled to the finish the lower ledge of the internal flange of the collar and the liner are both seated on the top sealing surface, the internal flange is outboard of the liner, coplanar with the liner, and surrounds the liner.

2. The closure assembly of claim 1, wherein the collar includes a plurality of spaced apart upper flanges above the upper ledge of the internal flange, the first coupling members of the disc are tabs seated on the upper ledge of the internal flange beneath the upper flanges when the disc is coupled to the collar.

3. The closure assembly of claim 1, wherein the collar includes collar threads above the upper ledge of the internal flange, the first coupling members of the disc are disc threads configured to cooperate with the collar threads to couple the disc to the collar.

4. The closure assembly of claim 2, wherein each one of the plurality of spaced apart upper flanges includes a ramped undersurface.

5. The closure assembly of claim 4, wherein each one of the tabs of the disc include a ramped outer surface that abuts the ramped undersurface of the spaced apart upper flanges when the disc is coupled to the collar, the ramped outer surface and the ramped undersurface extend at a common angle.

6. The closure assembly of claim 1, wherein the disc includes second coupling members for coupling with filling equipment for filling the container.

7. The closure assembly of claim 6, wherein the second coupling members are blind holes in an outer surface of the disc.

8. The closure assembly of claim 1, wherein the liner is sealable to a top sealing surface of the container.

9. The closure assembly of claim 1, wherein the liner is round and has a diameter that is less than an inside diameter of the internal flange of the collar.

10. The closure assembly of claim 1, wherein the liner is a multilayer liner including a backing layer secured to the disc with an adhesive, and a heat seal layer sealable to a top sealing surface of the container after the container has been filled.

11. The closure assembly of claim 10, the liner further comprising a wax layer between the backing layer and the heat seal layer.

12. The closure assembly of claim 11, the liner further comprising a paper layer between the backing layer and the wax layer, and a foil layer between the heat seal layer and the wax layer.

13. A closure assembly for filling a container under isolated conditions, the closure assembly comprising:

a collar including internal threads for coupling with a finish of the container, upper flanges spaced apart about the collar, and an internal flange extending around an inner surface of the collar, the internal flange has an upper ledge opposite to a lower ledge, the lower ledge is seated on an outer portion of a top sealing surface of the finish of the container when the collar is coupled to the finish;

a disc including tabs configured to cooperate with the upper flanges to removably couple the disc to the collar, the disc seated on the upper ledge of the internal flange when the disc is coupled to the collar; and a liner secured to the disc, the liner is sealable to a top sealing surface of the container;

wherein with the collar coupled to the finish the lower ledge of the internal flange of the collar and the liner are both seated on the top sealing surface, the internal flange is outboard of the liner, coplanar with the liner, and surrounds the liner.

14. The closure assembly of claim 13, wherein each one of the upper flanges includes a ramped undersurface.

15. The closure assembly of claim 14, wherein each one of the tabs of the disc include a ramped outer surface that abuts the ramped undersurface of the upper flanges when the disc is coupled to the collar, the ramped outer surface and the ramped undersurface extend at a common angle.

16. The closure assembly of claim 13, wherein the disc includes blind holes on an outer surface of the disc for coupling with filling equipment for removing the disc from cooperation with the collar.

17. The closure assembly of claim 13, wherein the liner is round and has a diameter that is less than an inside diameter of the internal flange of the collar.

* * * * *